(12) United States Patent
Lundh et al.

(10) Patent No.: US 6,718,180 B1
(45) Date of Patent: Apr. 6, 2004

(54) POWER LEVEL CONVERGENCE IN A COMMUNICATIONS SYSTEM

(75) Inventors: Peter Lundh, Skärholmen (SE); Magnus Almgren, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 361 days.

(21) Appl. No.: 09/696,334

(22) Filed: Oct. 24, 2000

(51) Int. Cl.[7] ................................................ H04B 7/00
(52) U.S. Cl. ................ 455/522; 455/127.1; 455/127.2; 455/127.3; 455/127.4; 455/127.5; 455/127.6; 455/69; 370/342
(58) Field of Search ............................... 455/522, 127, 455/69; 370/342

(56) References Cited

U.S. PATENT DOCUMENTS

| | | | |
|---|---|---|---|
| 5,383,219 A | 1/1995 | Wheatley, III et al. | 375/1 |
| 5,455,967 A | 10/1995 | Amezawa et al. | 455/69 |
| 5,461,639 A * | 10/1995 | Wheatley et al. | 370/342 |
| 5,579,373 A | 11/1996 | Jang | 379/59 |
| 5,604,766 A | 2/1997 | Dohi et al. | 375/200 |
| 5,722,044 A | 2/1998 | Padovani et al. | 455/33.1 |
| 5,799,010 A | 8/1998 | Lomp et al. | 370/335 |
| 5,842,114 A | 11/1998 | Ozluturk | 455/69 |
| 5,873,028 A | 2/1999 | Nakano et al. | 455/69 |
| 5,881,368 A | 3/1999 | Grob et al. | 455/69 |
| 5,884,187 A | 3/1999 | Ziv et al. | 455/522 |
| 5,893,035 A | 4/1999 | Chen | 455/522 |
| 5,946,346 A | 8/1999 | Ahmed et al. | 375/219 |
| 6,233,439 B1 * | 5/2001 | Jalali | 455/127 |
| 6,397,043 B1 * | 5/2002 | Kang | 455/69 |
| 6,512,925 B1 * | 1/2003 | Chen et al. | 455/442 |

FOREIGN PATENT DOCUMENTS

| | | |
|---|---|---|
| DE | 198 21 519 A 1 | 11/1999 |
| WO | WO 98/56200 | 12/1998 |
| WO | WO 99/52310 | 10/1999 |
| WO | WO 00/22757 | 4/2000 |
| WO | WO 00/59131 | 10/2000 |

OTHER PUBLICATIONS

Standard Search Report for RS 106044 US; date completed Jul. 30, 2001.

* cited by examiner

Primary Examiner—Sinh Tran
Assistant Examiner—David Nguyen

(57) ABSTRACT

Methods, systems, and arrangements enable balanced base station transmitter output power levels with respect to a receiving mobile station in a macro-diversity communication by adjusting a base station transmitter output power level responsive to power control command(s) sent by the mobile station and the (current) transmitter output power level of the base station. In a fixed adjustment step embodiment, power level convergence is enabled by adjusting the transmitter output power level of a given base station by a greater amount (e.g., than the nominal amount) when a power control command orders a power adjustment of the transmitter output power level towards a reference level and by adjusting the transmitter output power level by a lesser amount when a power control command orders a power adjustment of the is transmitter output power level away from the reference level. A continuous adjustment step embodiment is also disclosed.

11 Claims, 9 Drawing Sheets

POWER LEVEL CONVERGENCE IN A COMMUNICATIONS SYSTEM

BACKGROUND OF THE INVENTION

1. Technical Field of the Invention

The present invention relates in general to the field of communications systems, and in particular, by way of example but not limitation, to enabling transmitter power level convergence in wireless communications systems.

2. Description of Related Art

Access to wireless networks is becoming increasingly important and popular for business, social, and recreational purposes. Users of wireless networks now rely on them for both voice and data communications. Additionally, an ever increasing number of users demand both an increasing array of services and capabilities as well as greater and greater bandwidth for activities such as Internet surfing. To remedy the congestion caused by additional subscribers and to address demands for greater bandwidth, the wireless communications industry constantly strives to improve the number of services offered by and the capacity of their wireless networks. One approach to expanding and improving the infrastructure necessary to provide additional capacity and services is the implementation of systems designed around new standards for public land mobile networks (PLMNs). These new standards tend to be based on Code Division Multiple Access (CDMA) technology, such as the Universal Mobile Telecommunications System (UMTS), the Wideband CDMA (WCDMA) standard, etc.

In wireless systems based on CDMA technology, it is important that the base stations connected in macro-diversity with a mobile station transmit with about the same transmitter power, where transmitter power is the output power of the base station. In this context, the same transmitter power implies that the mobile station receives signals from the multiple base stations at approximately the same power level. Furthermore, it is even more important that the mobile station transmit with a power that is controlled by the base stations.

In macro-diversity connections, the base station that requires the lowest power from the mobile station controls. This implies that if one base station instructs the mobile station to increase power while another base station instructs the mobile station to decrease power, the mobile station should and will decrease transmitter power. These principles generally apply to most, if not all, CDMA-based systems.

In at least some CDMA systems, transmitter power at base stations and mobile stations is controlled by bits sent over the air interface. The bits instruct the other entity (e.g., a mobile station instructs a base station or vice versa) in a wireless communication to increase or decrease power. In a macro-diversity uplink context, the situation is relatively easy because there is only one mobile station that is receiving bit-based instructions for raising or lowering transmitter power. The mobile station simply compares the various received instructions and transmits with the lowest power as demanded by one or more base stations. In a macro-diversity downlink context, on the other hand, the situation is significantly more tricky as there are multiple base stations simultaneously transmitting, and each of the multiple base stations should coordinate their respective transmitter power outputs. There are unfortunately different predicaments that the mobile station and the multiple base stations may encounter while engaged in a macro-diversity communication that are not currently solved or handled by any existing standard or any other conventional approaches.

SUMMARY OF THE INVENTION

The deficiencies and oversights of existing approaches are overcome by the methods, systems, and arrangements of the present invention. For example, as heretofore unrecognized, it would be beneficial if base station transmitter power could be adjusted to avoid un-balanced base station transmitter power situations in macro-diversity communications. In fact, it would be beneficial if base station transmitter power could be adjusted so as to enable base station transmitter power convergence, or reception power balance at the mobile station, from the multiple base station transmissions.

Methods, systems, and arrangements in accordance with the present invention enable balanced base station transmitter output power levels with respect to a receiving mobile station in a macro-diversity communication. In macro-diversity communications, the receiving mobile station needs to control the transmitter output power level of the downlink channel, which includes transmissions from at least two transmitting base stations. However, the mobile station only sends one set of Transmission Power Control (TPC) bits in the uplink channel to all the base stations in the macro-diversity communication. Consequently, power control instructions that are appropriate for one base station may be received at and acted on by one or more of the other base stations. Additionally, because the base station requesting the lowest transmission output power level from the mobile station dominates, base stations that need a higher transmission output power level may not receive requests from the mobile station to increase their own power level.

Moreover, different channels to and from the various base stations involved in a macro-diversity communication may have differing bit error rates (BERs). One of the inherent problems with power control schemes is that the measured power corresponds to a first direction (e.g., the downlink/uplink) while the TPC bits to control the measured power are transmitted in a second direction (e.g., the uplink/downlink). The TPC bits are thus transmitted on a channel that is opposite to that of the measured channel, and each channel may be under the effects of different BERs, which further hinders the ability of a traditional power control scheme to recover from an unbalanced power level situation. In effect for traditional power control schemes, TPC bits may be wrong, may be received inappropriately, or may not be received appropriately by the various intended base stations, causing a situation where the transmission output power of one or more base stations may become unbalanced or become even more unbalanced. The present invention ameliorates this unbalanced situation by adjusting base station transmitter output power level responsive both to the power control instructions from the mobile station and to the respective current base station transmitter power output levels. Advantageously, application of the principles of the present invention enable the ultimate convergence of power output levels regardless of the extent of the initial unbalanced power level situation or situations.

In certain fixed adjustment step embodiment(s), a base station in a macro-diversity communication adjusts transmitter output power level in fixed steps. If a base station is above a reference threshold transmitter power output level, a received power control command to increase transmitter output power causes the base station to increase the transmitter output power level by an amount less than a nominal adjustment step amount, and a received power control command to decrease transmitter output power causes the base station to decrease the transmitter output power level by an amount greater than the nominal adjustment amount.

If, on the other hand, a base station is below a reference threshold transmitter power output level, a received power control command to increase transmitter output power causes the base station to increase the transmitter output power level by an amount greater than a nominal adjustment step amount, and a received power control command to decrease transmitter output power causes the base station to decrease the transmitter output power level by an amount less than the nominal adjustment amount. In certain continuous adjustment step embodiment(s), the adjustment steps implemented by the base station are determined according to a continuously varying smooth function. The continuously varying smooth function provides for a gradual change in the power adjustment step as determined responsive to an increase/decrease power control command and the current transmitter output power level of the relevant base station. (It should be noted that the term "function", as used herein, may also refer to graphs and/or equations with two or more identical x-axis (abscissa) values.)

Implementation of certain principles in accordance with the present invention enable a balanced transmitter output power relationship of two or more base stations with respect to a mobile station in a macro-diversity communication. The balanced transmitter output power relationship is enabled, at least in part, by adjusting the transmitter output power level of a given base station of the two or more base stations by a greater amount (e.g., than a nominal amount) when a power control command orders a power adjustment of the current transmitter output power level towards a reference level and by adjusting the transmitter output power level of a given base station by a lesser amount (e.g., than the nominal amount) when a power control command orders a power adjustment of the current transmitter output power level away from the reference level.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the methods, systems, and arrangements of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, other hardware, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail.

A preferred embodiment of the present invention and its advantages are best understood by referring to FIGS. 1–10 of the drawings, like numerals being used for like and corresponding parts of the various drawings. Aspects of the emerging Wideband Code Division Multiple Access (WCDMA) standard, as well as Global System for Mobile Communications (GSM) systems, are used to describe embodiments of the present invention. However, it should be understood that the principles of the present invention are applicable to other wireless communication standards (or systems), especially those involving communications related to power control during macro-diversity, for example.

Figure 1:
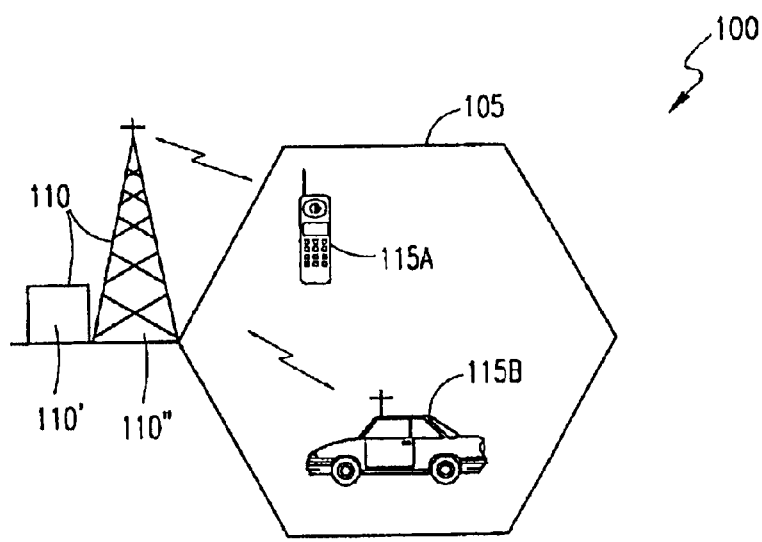
FIG. 1 illustrates an exemplary portion of an exemplary wireless communications system with which the present invention may be advantageously practiced.

With reference now to FIG. 1, an exemplary portion of an exemplary wireless communications system with which the present invention may be advantageously practiced is illustrated generally at 100. The (portion of) wireless communications system 100 includes a cell 105 that is served by a base station (BS) 110. The BS 110 may be composed of or affiliated with a radio base station (RBS) 110" (e.g., a base transceiver station (BTS) in GSM), a radio network controller (RNC) 110' (e.g., a base station controller (BSC) in GSM), and/or other network-side components of the wireless communications system 100. Within the cell 105 are multiple mobile stations (MSs) 115A and 115B, each of which may be in communication with the wireless network infrastructure as represented by the BS 110. Each MS 115 may be, for example, a hand-held cellular phone (e.g., the MS 115A), a vehicle-mounted MS (e.g., the MS 115B), a data terminal with a wireless link (not specifically shown), etc. While only two MSs 115 are shown in the wireless communications system 100, many more MSs 115 are usually present within a cell 105. Also, it should be noted that the wireless communications system 100 is usually composed of many such cells 105, BSs 110, etc.

Figure 2:
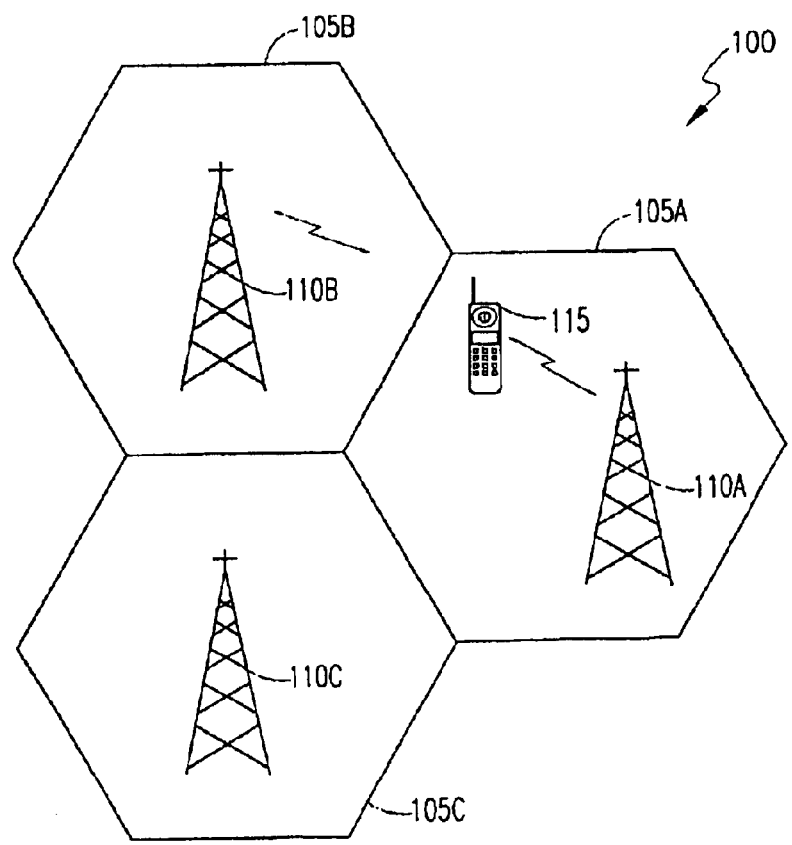
FIG. 2 illustrates another exemplary portion of the exemplary wireless communications system with which the present invention may be advantageously practiced.

With reference now to FIG. 2, another exemplary portion of the exemplary wireless communications system with which the present invention may be advantageously practiced is illustrated at 100. In this exemplary portion of the exemplary wireless communications system 100, three cells 105 (e.g., cells 105A, 105B, and 105C) are illustrated. It should be understood that there are typically many more such cells 105. Also illustrated are three BSs (e.g., BSs 110A, 110B, and 110C), one for each cell 105. It should be understood that while omnidirectional BSs/cells are illustrated, the present invention is equally applicable to sectorized BSs/cells (e.g., where one BS 110 effectively serves, for example, three (3) cells 105). An MS 115 is illustrated as physically within cell 105A and in communication with the BS 110A, as indicated by the transmission signal therebetween.

However, as indicated by another transmission signal between the MS 115 and the BS 110B, the MS 115 may also be in communication with the BS 110B. Such dual communications or communication switches can occur, for example, during handoff (e.g., soft, hard, etc.), during macro-diversity, etc. Hard handoff is effectuated when an MS (e.g., the MS 115) switches from one BS (e.g., the BS 110A) to another BS (e.g., the BS 110B) without being simultaneously in communication with both. Soft handoff, on the other hand, is effectuated when an MS (e.g., the MS 115) switches from one BS (e.g., the BS 110A) to another BS (e.g., the BS 110B) while being contemporaneously in communication with both, at least temporarily. Macro-diversity occurs when an MS (e.g., the MS 115) is simultaneously in communication with two or more BSs (e.g., the BSs 110A and 110B) and is transceiving essentially similar information so as to improve the probability of ultimately communicating (e.g., receiving and decoding) accurately the intended information, for example. It should be noted that soft handoff may be considered as a subset of macro-diversity.

The present invention is related, in at least certain embodiment(s), to situations in which, e.g. CDMA, BSs that are engaged in a macro-diversity communication receive and interpret power control commands (e.g., fast Transmitter Power Control (TPC) bits) that are sent by the relevant mobile station in different manners. Unfortunately, such situations may result in one or more BSs of the macro-diversity communication switching to or settling on a transmitter output power that is too low for the mobile station to receive. Consequently, the BS that is transmitting at an output power that is too low to be "heard" by the mobile station may not be able to set the transmission output power of the mobile station. The mobile station may therefore not be transmitting at an output power that is dictated by the least demanding BS, as is preferable in traditional CDMA systems.

Figure 3A:
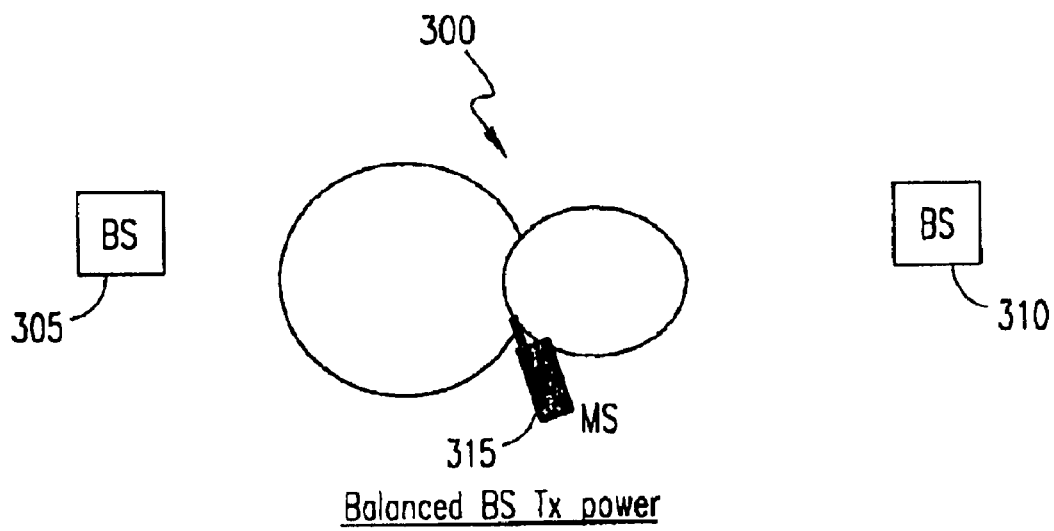
FIG. 3A illustrates a balanced base station output power transmission relationship with respect to a mobile station.

Referring now to FIG. 3A, a balanced base station output power transmission relationship with respect to a mobile station is illustrated generally at 300. The relationship 300 involves a macro-diversity communication among a BS 305, a BS 310, and an MS 315. The MS 315 is receiving balanced base station transmitter power from the BS 305 and the BS 310. This is a desirable condition. An un-balanced base station output power transmission relationship, on the other hand, is an undesirable condition.

Figure 3B:
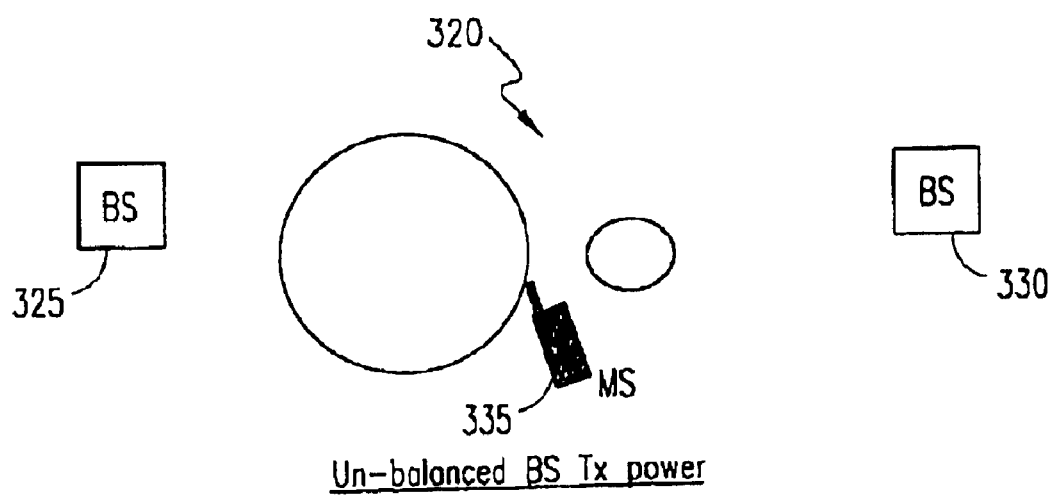
FIG. 3B illustrates an un-balanced base station output power transmission relationship with respect to a mobile station.

Referring now to FIG. 3B, an un-balanced base station output power transmission relationship with respect to a mobile station is illustrated generally at 320. The relationship 320 involves a macro-diversity communication among a BS 325, a BS 330, and an MS 335. The MS 335 is receiving a transmission from the BS 325, but the MS 335 is not receiving a transmission from the BS 330 because the transmitter output power of the BS 330 is too low. Because the MS 335 may therefore not be transmitting at an output power that is dictated by the least demanding base station (e.g., the BS 330), the MS 335 may heavily interfere with other mobile stations (e.g., users) that are connected to the BS 330. The MS 335 may be transmitting at too high of an output power level because it may not "hear" (e.g., receive) the TPC bits from the BS 330 while responding all the while to the TPC bits from the BS 325. Although the BS 330 is transmitting TPC bits, the transmitter output power from the BS 330 is too low for the MS 335 to receive the instructions to decrease its output power. It would be beneficial for the BS 330 to be returned to a normal transmitter power by using some guiding principle or rule. Otherwise, the BS 330 may be dropped from the active set as its information does not reach the MS 335.

Figure 3C:
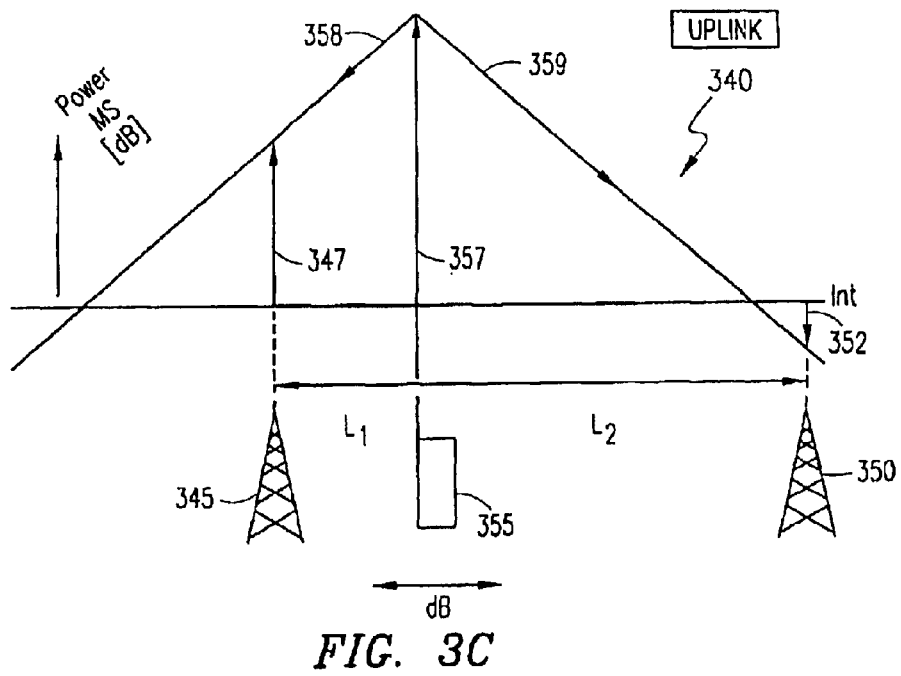
FIG. 3C illustrates an uplink transmission power relationship between a mobile station and two base stations.

With reference now to FIG. 3C, an uplink transmission power relationship between a mobile station and two base stations is illustrated generally at 340. The uplink transmission power relationship 340 involves a macro-diversity communication among a BS 345, a BS 350, and an MS 355. The uplink relationship 340 illustrates a graph of attenuation (x-axis/abscissa) versus power from the MS [db] (y-axis/ordinate). The attenuation may be caused by, for example, distance, obstructions, interference, a combination thereof, etc. As indicated by the attenuations $L_1$ and $L_2$, the BS 345 experiences less attenuation than the BS 350 with respect to the power transmitted 357 from the MS 355. Consequently, the power of the transmission 357 from the MS 355 has attenuated significantly more by the time/point it reaches the BS 350 as compared to the time/point it reaches BS 345.

Because the attenuation is graphed on a logarithmic scale, the power transmission 357 from the MS 355 decreases for each of the BS 345 and the BS 350 at a slew rate of one (as represented by arrow 358 and arrow 359, respectively) In other words, the power decreases by one dB for every one dB of attenuation. The respective received power levels of the transmission 357 from the MS 355 are represented by the upward arrow 347 for the BS 345 and the downward arrow 352 for the BS 350. As indicated by the points at which the arrows 347 and 352 terminate along the y-axis, the greater attenuation $L_2$ as compared to $L_1$ causes the power level received at the BS 350 to be lower than the power level received at the BS 345. Consequently, the BER from the perspective of the BS 350 is typically greater than the BER from the perspective of the BS 345.

Figure 3D:
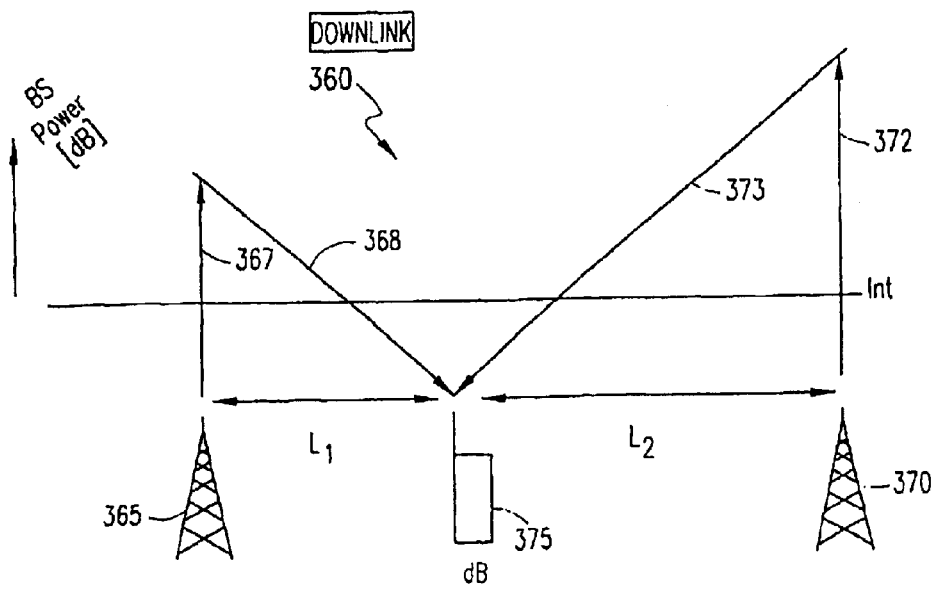
FIG. 3D illustrates a downlink transmission power relationship between a mobile station and two base stations.

With reference now to FIG. 3D, a downlink transmission power relationship between a mobile station and two base stations is illustrated generally at 360. The downlink transmission power relationship 360 involves a macro-diversity communication among a BS 365, a BS 370, and an MS 375. The downlink relationship 360 illustrates a graph of attenuation (x-axis/abscissa) versus power from the (respective) BSs [db] (y-axis/ordinate). As indicated by the attenuations $L_1$ and $L_2$, transmissions from the BS 365 experience less attenuation as compared to transmissions from the BS 370 with respect to the MS 375. Consequently, the power of the transmission 372 from the BS 370 must be initially greater than the power of the transmission 367 from the BS 365 in order for the power levels (as represented by arrow 373 and arrow 368, respectively) received by the MS 375 to be approximately equal. In other words, while the BSs 365 and 370 may transmit at different power levels 367 and 372, respectively, the power levels of these respective transmissions as received by the MS 375 may still be equal. Both of the BSs 365 and 370 contribute to the macro-diversity communication with the MS 375, but because $L_1$ is less than $L_2$, the BS 365 may transmit at a lower power than the BS 370. In other words, although the BS 365 may transmit at a lower power level, the BS 365 may still make a significant contribution to the macro-diversity communication.

Figure 4:
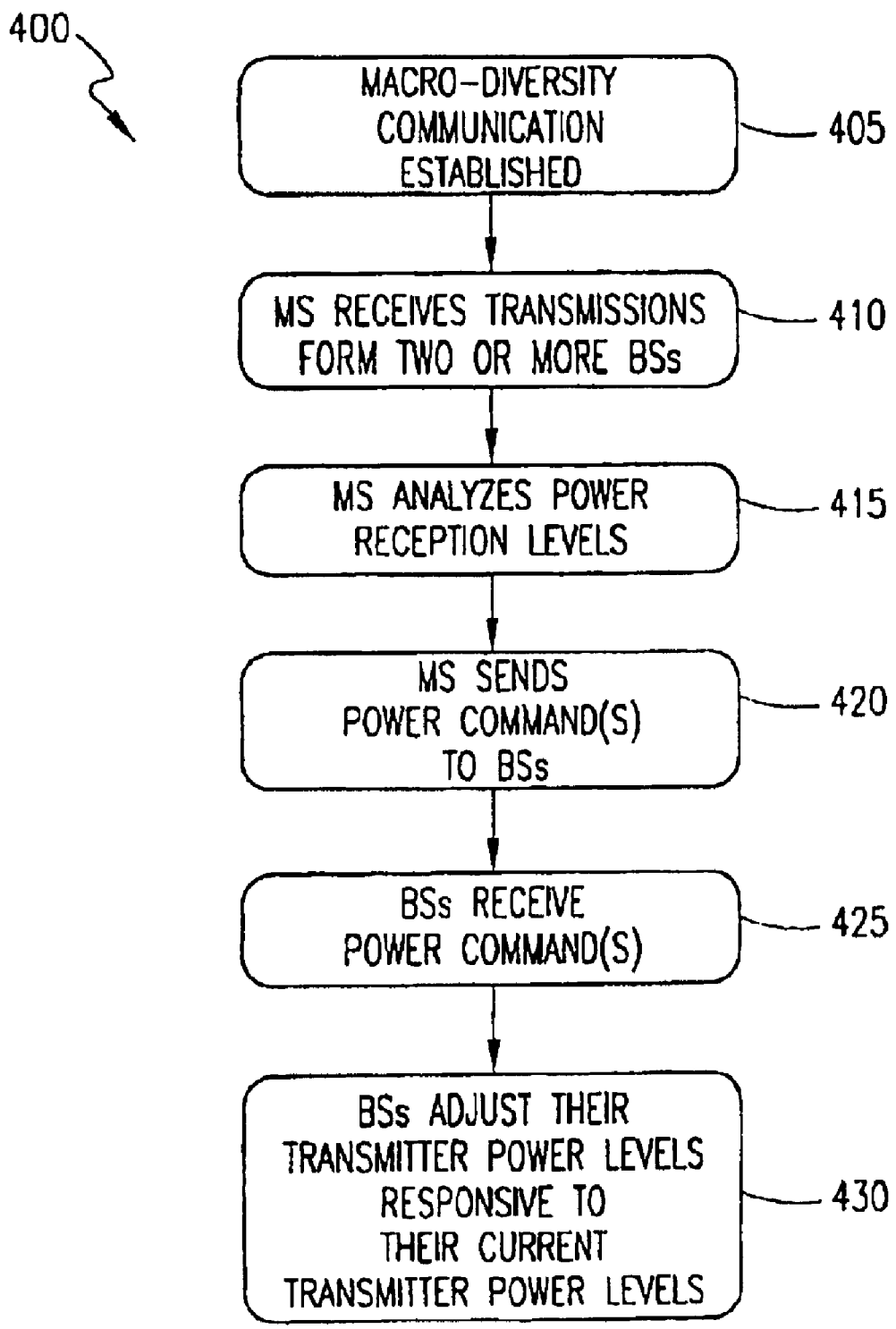
FIG. 4 illustrates an exemplary method in flowchart form for enabling power level convergence in accordance with the present invention.

With reference now to FIG. 4, an exemplary method in flowchart form for enabling power level convergence in accordance with the present invention is illustrated generally at 400. Macro-diversity communication is established between an MS and two or more BSs (step 405). The MS receives transmissions from the two or more BSs (step 410). The MS analyzes the power levels of the received transmissions (step 415). In response to the analysis of the power levels of the transmissions received from the two or more BSs, the MS sends a power control command (e.g., in the form of a TPC bit in exemplary embodiment(s)) to the two or more BSs (step 420). The two or more BSs receive the power control command(s) (step 425), and they adjust their transmitter output power levels responsive to their respective current transmitter output power levels (and the received power control command(s)) (step 430). As explained below, the consideration by each BS of its own current transmitter output power level enables power level convergence in accordance with the present invention.

In accordance with certain embodiment(s), BS transmitter output power is scaled differently (e.g., in plus and minus steps) depending on the (current) BS transmitter output power level. In fixed adjustment step embodiment(s), the power level adjustment steps have a fixed higher (than nominal) value when the BS transmitter output power level is changing towards a reference transmitter power level, but the power level adjustment steps have a fixed lower (than nominal) value when the BS transmitter output power level is changing away from the reference transmitter power level. In continuous adjustment step embodiment(s), the power level adjustment steps are based on a continuously varying (e.g., smoothly varying) curve that is a function of the current BS transmitter output power level as well as the received power control command to either raise or lower the BS transmitter output power level.

The exemplary descriptions herein of the present invention are based on exemplary "standard" power adjustments of a one (1) dB increase or a one (1) dB decrease in accordance with the instructions of the TPCs. In other words, nominal +1 dB and −1 dB steps are used to illustrate the invention. It should be noted, however, that the principles of the present invention are also applicable to "standard" adjustments of, for example, 0.25, 0.5, 1, 2, 4 dB, etc. Any other steps (e.g., in dB) or any other method (e.g., a linear function using a suitable algorithm) may alternatively be used.

Figure 5:
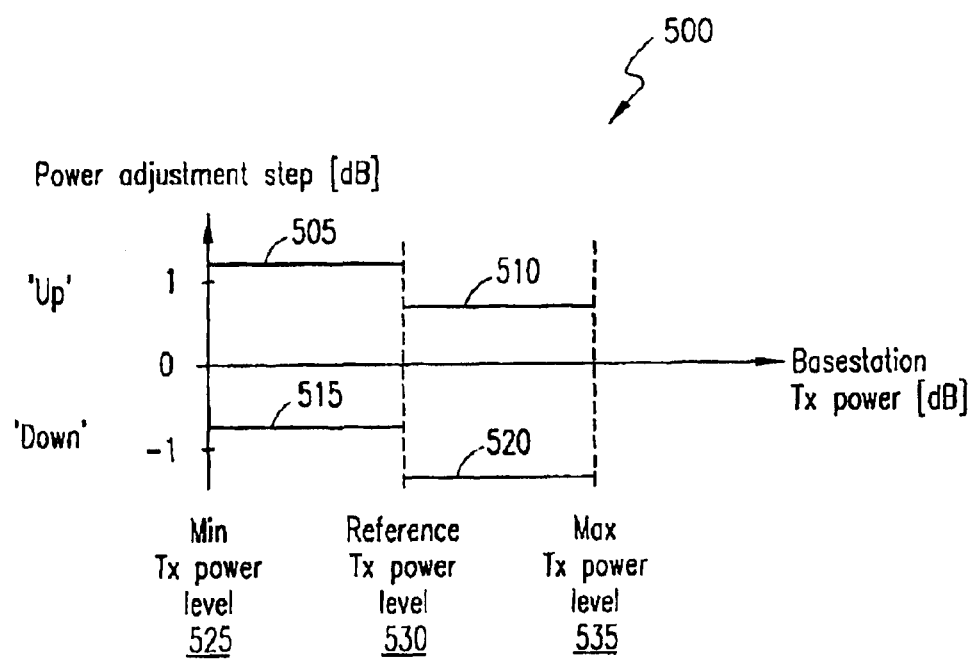
FIG. 5 illustrates a graph of an exemplary fixed power adjustment step embodiment in accordance with the present invention.

With reference now to FIG. 5, a graph of an exemplary fixed power adjustment step embodiment in accordance with the present invention is illustrated generally at 500. In the graph 500, base station transmitter (Tx) (output) power [dB] versus power adjustment step [dB] is graphed. The upper graph portion (composed of zones 505 and 510) corresponds to a raise/increase/up power control command from an MS, and the lower graph portion (composed of zones 515 and 520) corresponds to a lower/decrease/down power control command. The x-axis (abscissa) is marked at a minimum transmission power level 525, a reference transmission power level 530, and a maximum transmission power level 535.

By way of example, assuming that a BS involved in a macro-diversity communication is currently transmitting at a power level that is below the reference transmission power level, then the BS decreases its power level less than a nominal TPC (e.g., decrease) command received from the MS. Assuming that the BS is currently transmitting at a power level that is above the reference transmission power level, then the BS decreases its power level more than the nominal TPC (e.g., decrease) command. As a result, if the macro-diversity-involved BSs transmit at a transmission power level that passes the reference transmission power level, then the BSs converge their respective transmission output power levels. It should be noted that the reference transmission power level may be established using, for example, an average value signaled to the involved base stations that set(s) the reference transmission power level.

Continuing now with reference to FIG. 5, the graph 500 introduces a scaling onto the exemplary +1/−1 dB TPC steps depending on whether the (current) transmission output power level is above or below the reference transmission power level 530. With reference to the four zones 505, 510, 515, and 520 of the graph 500, four exemplary cases are now described. For example, with reference to the zone 505, if the (present) output power level in a BS is below the reference transmission (output) power level 530 when the BS receives TPC bit(s) requesting that the BS increase its power by +1 dB, then the BS adjusts its transmission output power level by +1.2 dB. With reference to zone 510, if the (present) output power level in a BS is above the reference transmission (output) power level 530 when the BS receives TPC bit(s) requesting that the BS increase its power by +1 dB, then the BS adjusts its transmission output power level by +0.8 dB. With reference to zone 515, if the (present) output power level in a BS is below the reference transmission (output) power level 530 when the BS receives TPC bit(s) requesting that the BS decrease its power by −1 dB, then the BS adjusts its transmission output power level by −0.8 dB. With reference to zone 520, if the (present) output power level in a BS is above the reference transmission (output) power level 530 when the BS receives TPC bit(s) requesting that the BS decrease its power by −1 dB, then the BS adjusts its transmission output power level by −1.2 dB.

It should be noted that the reference transmission power level may be configured to a typical value that is valid for the soft-handover area where a typical mobile is located or to a value that is an average for the soft-handover area signaled to the involved BSs that are valid for the present MS connection. Such a mean value reference transmission power level may be signaled to the involved BSs regularly. The reference transmission power level or the function(s) are preferably the same for all BSs belonging to the active set of the MS. However, the reference transmission power level or the function(s) may alternatively be set differently for each BS and/or be set differently for each connection. The function used in a continuous adjustment step embodiment may be related to the involved MS or the current active set of the MS. Alternatively, the reference transmission power level or the function can be set per connection and/or per active set. Furthermore, the function(s) in the RBSs can be adapted according to one or more parameters in the system. The function(s) may also differ based on handover parameters, current weather, relevant services, etc.

Figure 6:
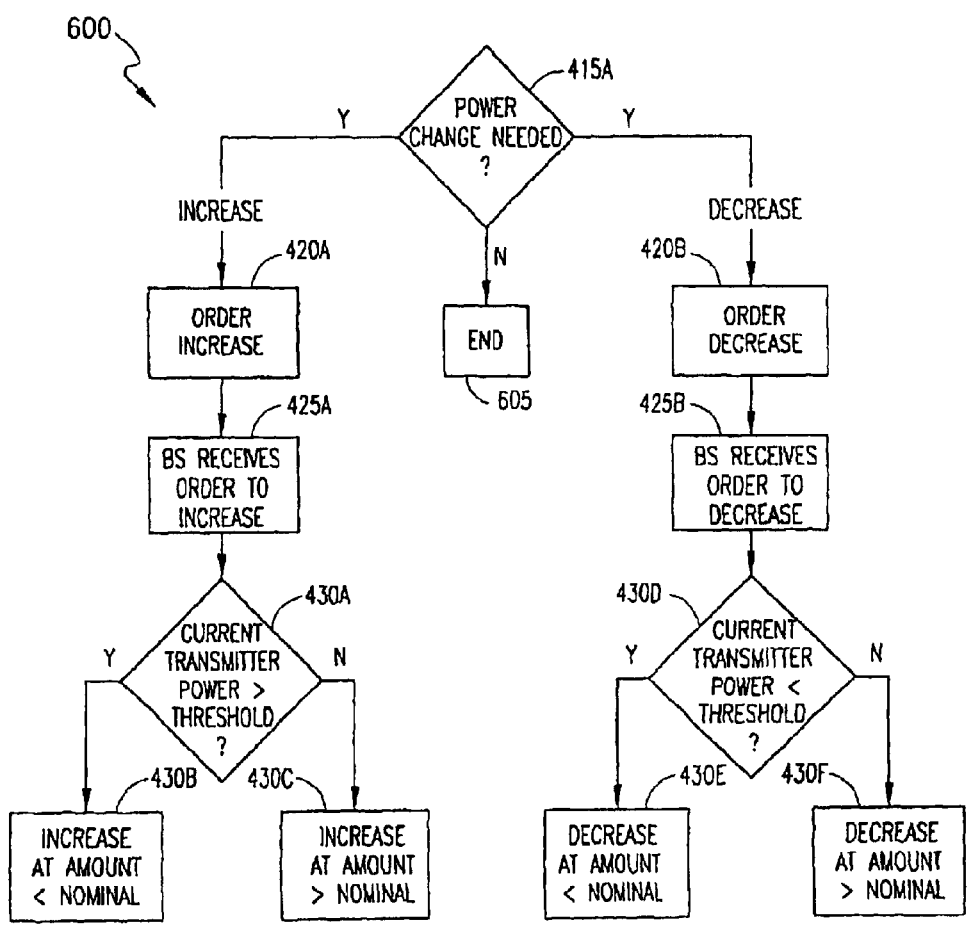
FIG. 6 illustrates an exemplary method in flowchart form for enabling power level convergence using an exemplary fixed power adjustment step embodiment in accordance with the present invention.

With reference now to FIG. 6, an exemplary method in flowchart form for enabling power level convergence using an exemplary fixed power adjustment step embodiment in accordance with the present invention is illustrated generally at 600. The flowchart 600 reflects an exemplary embodiment that corresponds approximately to steps 415, 420, 425, and 430 of the flowchart 400 (of FIG. 4). The MS determines whether or not a power change (by the connected BSs) is needed (step 415A). If not, then the flowchart 600 terminates (step 605). If so, and an increase is needed, then the MS orders a transmission output power level increase (e.g., using TPC bits) (step 420A). A BS receives from the MS the order to increase transmission output power (step 425A). The BS determines whether the current transmission output power is greater than a predetermined threshold (step 430A). If so, then the BS increases transmission output power by an amount that is less than a standard or nominal amount (step 430B). If not, then the BS increases transmission output power by an amount that is greater than the standard or nominal amount (step 430C).

If, on the other hand, the MS determines that a decrease in BS transmitter output power is needed (at step 415A), then the MS orders a transmission output power level decrease (e.g., using TPC bits) (step 420B). A BS receives from the MS the order to decrease transmission output power (step 425B). The BS determines whether the current transmission output power is less than a predetermined threshold (step 430D). If so, then the BS decreases transmission output power by an amount that is less than a standard or nominal amount (step 430E). If not, then the BS decreases transmission output power by an amount that is greater than the standard or nominal amount (step 430F). It should be understood that one of ordinary skill in the art, after reading and understanding the principles of the present invention, may substitute alternative equality or inequality logical arguments.

Figure 7A:
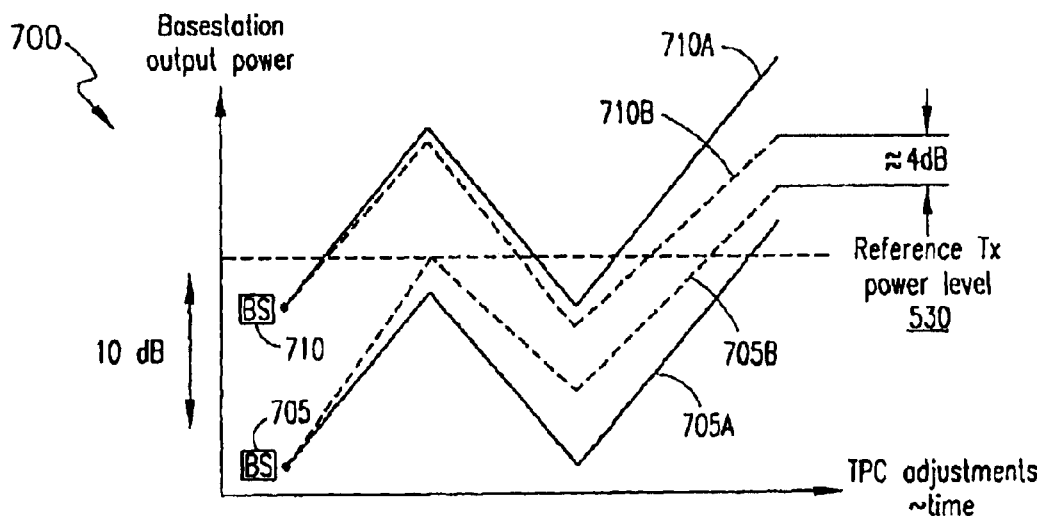
FIG. 7A illustrates a graph of an exemplary base station power convergence for a macro-diversity communication in accordance with the present invention.

With reference now to FIG. 7A, a graph of an exemplary base station power convergence for a macro-diversity communication in accordance with the present invention is illustrated generally at 700. In the graph 700, TPC adjustments (which is proportional to time) (x-axis/abscissa) versus base station output power (y-axis/ordinate) is graphed. In the exemplary situation graphed, a BS 705 has a transmission output power level that is 10 dB too low at the MS (not specifically shown in the graph 700) as compared to a BS 710. One possible reason is that the BS 705 has previously mis-interpreted some TPC increase commands by not increasing its power. The transmissions by the BS 705 may therefore be "lost" to the MS; in other words, the MS cannot "hear" the BS 705.

Two cases are illustrated in the graph 700: a nominal case 705A,710A (solid line) and a scaling case 705B,710B (dashed line). In the nominal case 705A,710A, the BSs adjust their respective transmission output power level according to the TPC bit values (e.g., +1 or −1 dB) with no correlation to a reference transmission power level. In the scaling case 705B, 710B in accordance with certain embodiment(s) of the present invention, the BSs scale the orders from the TPC bits from the MS around the reference transmission power level 530. Assuming that the MS requests that the BSs increase power by 10 dB (e.g., in 10 +1 dB steps), then decrease power by 10 dB, and finally increase power by 10 dB (e.g., in a total of 30 TPC commands), the case without convergence (the nominal case 705A, 710A) and the case with convergence (the scaling case 705B, 710B) are shown in the graph 700. After only 30 steps, and having passed the reference transmission power level 530 from one (1) to three (3) times, the power differential between the BS 705 and the BS 710 has decreased from 10 dB to approximately 4 dB in the scaling case in accordance with certain embodiment(s) of the present invention.

Figure 7B:
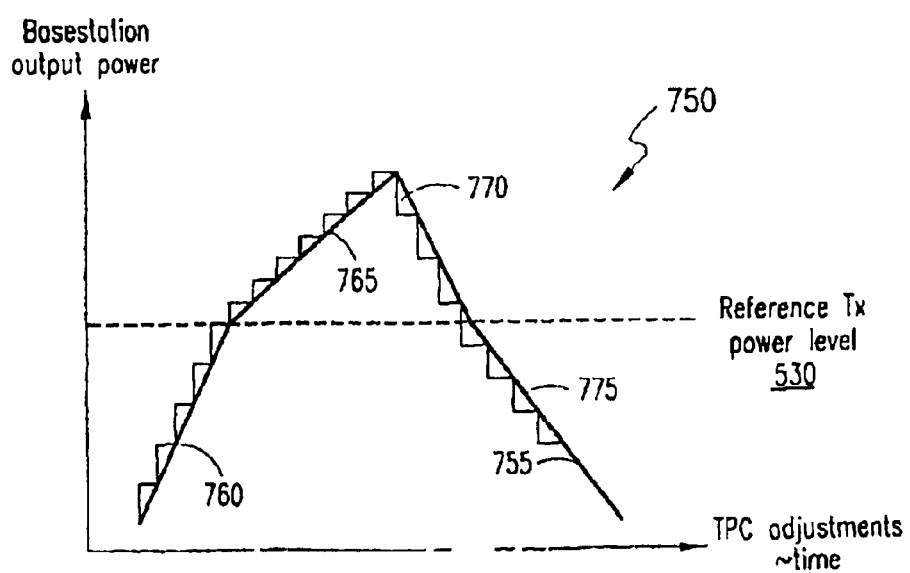
FIG. 7B illustrates a graph of an exemplary base station power level adjustment in accordance with the present invention.

With reference now to FIG. 7B, a graph of an exemplary base station power level adjustment in accordance with the present invention is illustrated generally at 750. In the graph 750, TPC adjustments (which is proportional to time) (x-axis/abscissa) versus base station output power (y-axis/ordinate) is graphed. In the exemplary situation graphed, a BS output power curve 755 is shown with four (4) zones. As indicated by the "stair-stepped" markings that shadow the curve 755 in each zone, each of the four (4) zones has a different slope. As is also apparent after studying the "stair-stepped" markings, the zones 760 and 770 have steeper slopes (and thus greater step sizes) than the zones 765 and 775. Notably, the zones representative of when the BS output power level is approaching the reference transmission power level 530, namely zones 760 and 770, have the steeper slopes (and thus the larger step sizes). In other words, under certain principles in accordance with the present invention (e.g., those described hereinabove with reference to FIG. 5), the rate of change of the BS output power level, as represented by the slope or slew rate thereof, is greater when the BS output power level is changing toward the reference transmission power level 530 and lower when the BS output power level is changing away from the reference transmission power level 530.

With regard to implementation of an exemplary dB adjustment for the fixed adjustment steps embodiment, the exemplary 0.8 and 1.2 dB factors used in the embodiment above can be tricky to implement as compared to the nominal 1 dB adjustment step. However, the same goal may be attained if application of the scaling factor is spread over time. For example, a "0.8" factor may be implemented by omitting every $5^{th}$ TPC command that is related to the 0.8 decrease or the 0.8 increase factor. The "1.2" factor, on the other hand, may be implemented by adding an additional command for every $5^{th}$ TPC command that is related to the 1.2 decrease or the 1.2 increase factor. One of ordinary skill in the art will be able to implement other scaling factors by spreading them over time after reading and understanding the principles of the present invention.

The fixed steps adjustment embodiment (e.g., as described hereinabove with reference to FIGS. 5 and 6) includes two step sizes only (e.g., "0.8" and "1.2" steps or factors only). There is one step size on either side of the reference value, where the up and down power steps may be considered to be equal (at least in certain embodiment(s)). Certain fixed steps adjustment embodiment(s) may be considered to employ step function(s). However, another alternative is to use a power adjustment step algorithm with a continuous, smoothly varying function. In principle, a power adjustment step size algorithm may describe any applicable curve as a function of a BS (or cell) transmitter output power level and the received TPC commands.

Figure 8:
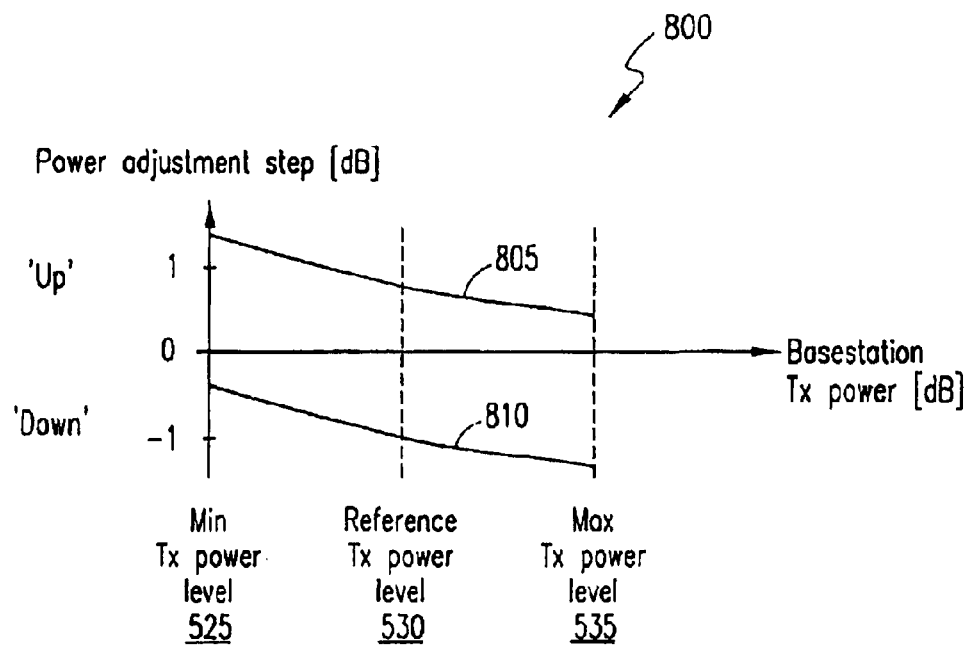
FIG. 8 illustrates a graph of an exemplary continuous power adjustment step embodiment in accordance with the present invention.

With reference now to FIG. 8, a graph of an exemplary continuous power adjustment step embodiment in accordance with the present invention is illustrated generally at 800. In the graph 800, base station transmitter (Tx) (output) power [dB] versus power adjustment step [dB] is graphed. The upper curve 805 corresponds to a raise/increase/up power control command from an MS, and the lower curve 810 corresponds to a lower/decrease/down power control command. Each of the exemplary curves 805 and 810 are continuous and smoothly varying across the minimum to maximum base station transmitter output power level range. The x-axis (abscissa) is marked at a minimum transmission power level 525, a reference transmission power level 530, and a maximum transmission power level 535. The reference transmission power level 530 is of less importance in continuous power adjustment step embodiment(s) because it implies only that the up and down power adjustment steps are equal. The transmission output power levels of the BSs (and therefore for each cell because transmission power is set for each cell) converge even if the BSs are off of the reference transmission power level 530. It should be noted that these step offsets and functions may differ in different RBSs. One option is to permit one RBS to have a higher transmission output power level in general if, for example, the antenna(s) of that one RBS have a lower gain as compared to the antenna(s) of one or more other RBSs.

Figure 9:
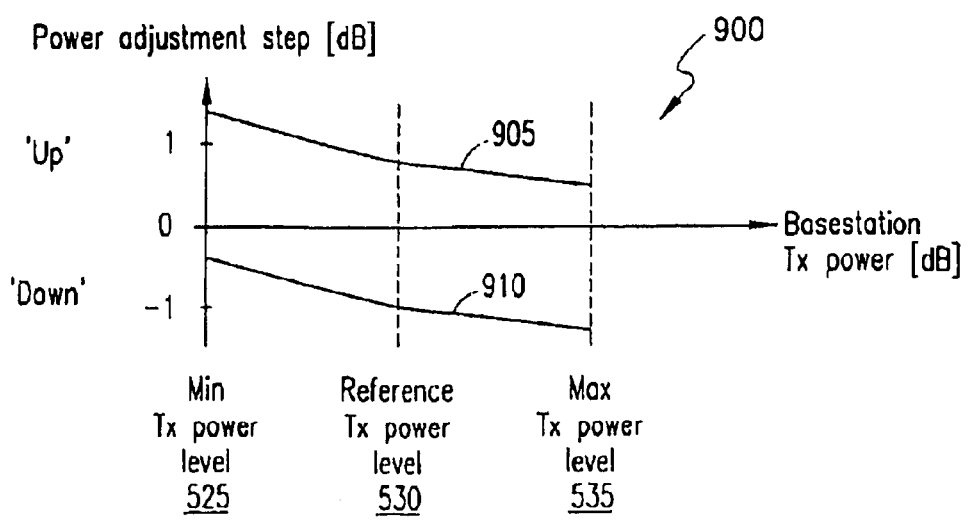
FIG. 9 illustrates a graph of another exemplary continuous power adjustment step embodiment in accordance with the present invention.

With reference now to FIG. 9, a graph of another exemplary continuous power adjustment step embodiment in accordance with the present invention is illustrated generally at 900. In the graph 900, base station transmitter (Tx) (output) power [dB] versus power adjustment step [dB] is graphed. The upper curve 905 corresponds to a raise/increase/up power control command from an MS, and the lower curve 910 corresponds to a lower/decrease/down power control command. Each of the exemplary curves 905 and 910 are continuous and smoothly varying across the minimum to maximum base station transmitter output power level range. The x-axis (abscissa) is marked at a minimum transmission power level 525, a reference transmission power level 530, and a maximum transmission power level 535. The exemplary curves 905 and 910 establish functions in which the deviation from the nominal power adjustment step amount is greatest when the base station is nearest minimum transmitter output power levels. It should be understood that any other alternative algorithms/functions may in principle be used instead.

Figure 10:
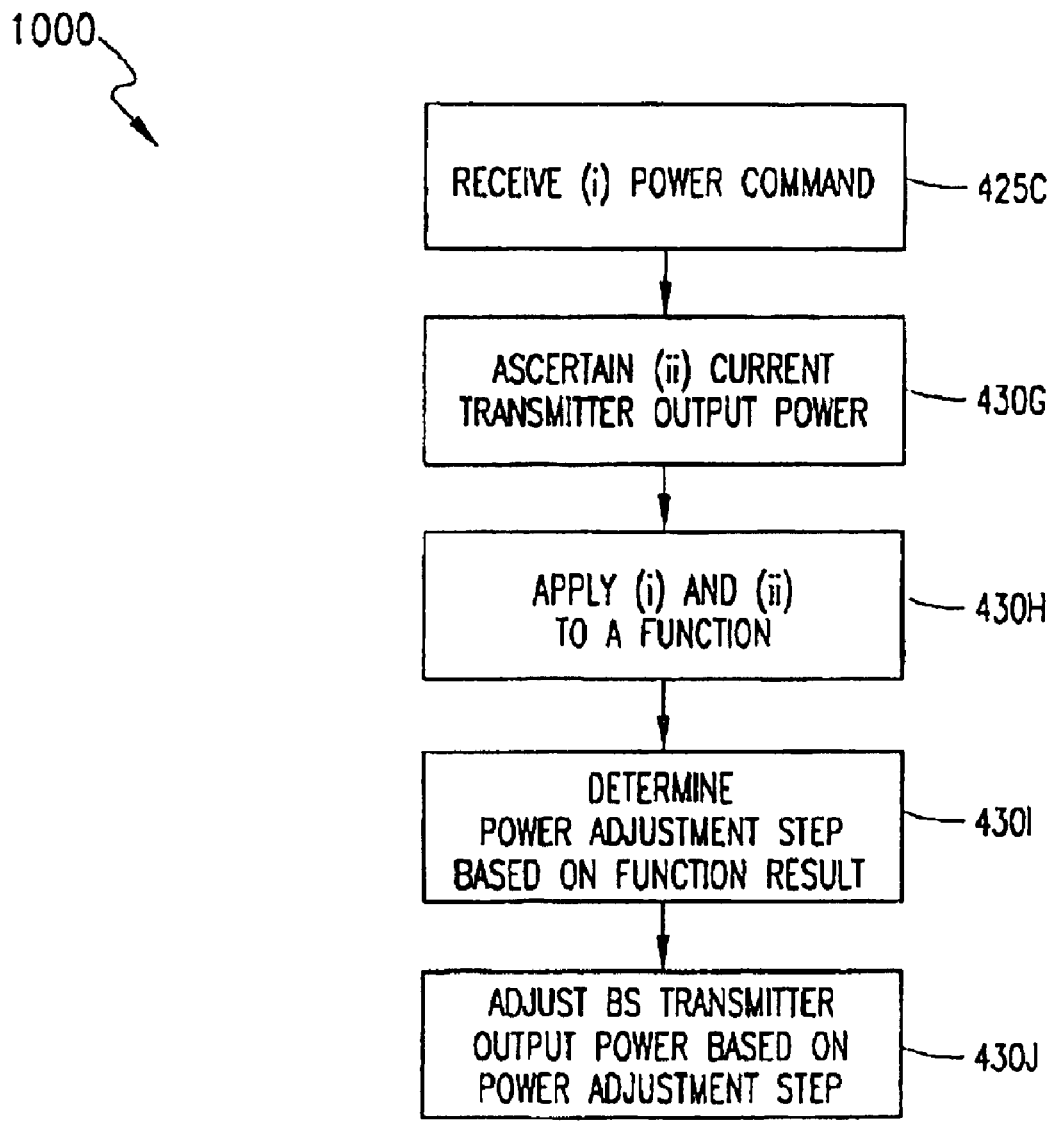
FIG. 10 illustrates an exemplary method in flowchart form for enabling power level convergence using an exemplary continuous power adjustment step embodiment in accordance with the present invention.

With reference now to FIG. 10, an exemplary method in flowchart form for enabling power level convergence using an exemplary continuous power adjustment step embodiment in accordance with the present invention is illustrated generally at 1000. The flowchart 1000 reflects an exemplary embodiment that corresponds approximately to steps 425 and 430 of the flowchart 400 (of FIG. 4). The BS receives a power control command (e.g., composed of TPC bits) (step 425C). The BS ascertains its own (current) transmitter output power level (step 430G). The received power control command and the (current) transmitter output power level are applied to a function or functions (e.g., a continuous, smoothly varying function or functions) (step 430H). The appropriate power adjustment step is determined based on the result of the function or functions (step 430I). The BS then adjusts its transmitter output power level based on the determined power adjustment step. The present invention, in its various embodiments, thus solves the problem of diverging transmitter output power levels of RBSs.

The present invention solves the problem of diverging transmitter output power levels of RBSs by, in certain embodiment(s), causing the transmitter output power level to effectively change more quickly when changing toward a reference level and to effectively change less quickly when changing away from such a reference level. In certain other embodiment(s), transmitter output power levels are caused to effectively change more quickly when changing away from a high or low transmission output power extreme and to effectively change less quickly when changing toward a high or low transmission output power extreme. As a result, transmission output power levels change more quickly when they are converging and less quickly when they are diverging. Another consequence and effect is that, in general, lower power users can increase their transmitter output power levels more quickly than relatively higher power users can increase their transmitter output power levels.

This effect is also beneficial, for example, in interference compensation situations. For instance, in any given interference situation, some transmitters are operating at a relatively high output power while other transmitters are operating at a relatively low output power. Assuming that the interference is increased (e.g., because new users arrive and are added to the system), a "compensation race" is started by the original power transmitters to compensate for the increased interference. This increased interference lowers the quality (e.g., as measurable by the BER) of received signals regardless of the output power at which the received signals are initially transmitted. This increased interference at the RBSs also forces their transmitter output powers upward due to the lowered reception quality. Under traditional schemes, compensation races are rather even between and among various users because all users increase their power with equivalent nominal steps, thus the rate of change (e.g., the slope or slew rate) of transmission output power for all users is approximately equivalent. However, it is advantageous to provide lower power users a larger power step as compared to higher power users when increasing transmission output power to improve corresponding reception quality.

When engaged in a compensation race, lower power users can therefore increase their reception quality faster than higher power users. Because interference is created predominantly by the higher power users, it is advantageous to cause the higher power users to "struggle" to increase their power further. As a result, the lower power users are permitted to compensate for the increased interference level before the higher power users. Enabling the lower power users to improve reception quality first by increasing their transmission output power first results in the overall increase to the system interference level due to the "compensation race" to be reduced or minimized. The principles of the present invention may therefore beneficially affect the overall interference level of a system because they may be employed to cause lower power users to increase power more quickly than higher power users when compensating for reduced reception quality caused by increased interference.

Although preferred embodiment(s) of the methods, systems, and arrangements of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for adjusting power in a base station, comprising the steps of:

receiving a power instruction from a mobile station that is engaged in a macro-diversity communication with the base station;

ascertaining a current power of the base station;

determining a power adjustment amount responsive to the power instruction from the mobile station that is engaged in the macro-diversity communication with the base station and the current power of the base station; and adjusting the current power of the base station based on the power adjustment amount, wherein said step of determining a power adjustment amount responsive to the power instruction and the current power of the base station comprises the steps of:

comparing the current power of the base station to a predetermined threshold; and setting the power adjustment amount equal to a first amount that is less than a first nominal amount if the power instruction corresponds to an increase command and the current power of the base station is greater than the predetermined threshold;

setting the power adjustment amount equal to a second amount that is greater than a second nominal amount if the power instruction corresponds to an increase command and the current power of the base station is not greater than the predetermined threshold;

setting the power adjustment amount equal to a third amount that is less than a third nominal amount if the power instruction corresponds to a decrease command and the current power of the base station is less than the predetermined threshold; or setting the power adjustment amount equal to a fourth amount that is greater than a fourth nominal amount if the power instruction corresponds to a decrease command and the current power of the base station is not less than the predetermined threshold.

2. The method according to claim 1, wherein said step of receiving a power instruction comprises the step of receiving a transmission output power command.

3. The method according to claim 2, wherein said step of receiving a transmission output power command comprises the step of receiving at least one transmission power control (TPC) command bit.

4. The method according to claim 1, wherein said step of ascertaining a current power of the base station comprises the step of ascertaining a current transmission output power level of the base station.

5. The method according to claim 1, wherein said step of determining a power adjustment amount responsive to the power instruction and the current power of the base station comprises the step of determining a fixed power adjustment step responsive to the power instruction and the current power of the base station.

6. The method according to claim 1, wherein said step of determining a power adjustment amount responsive to the power instruction and the current power of the base station comprises the step of determining a continuous power adjustment step responsive to the power instruction and the current power of the base station.

7. The method according to claim 1, wherein said step of adjusting the currant power of the base station based on the power adjustment amount comprises the step of at least one of decreasing or increasing the current power of the base station by the power adjustment amount in accordance with the power instruction.

8. The method according to claim 1, wherein said step of determining a power adjustment amount responsive to the power instruction and the current power of the base station comprises the step of determining the power adjustment step based, at least partly, on at least one of an active set of a mobile station, a mean value, a parameter of a wireless communications system of the base station, and a weather or services-related condition.

9. The method according to claim 1, wherein respective absolute values of the first, second, third, and fourth nominal amounts are equal.

10. The method according to claim 1, wherein said step of determining a power adjustment amount responsive to the power instruction and the current power of the base station comprises the step of applying information from the power instruction and the current power of the base station to at least one function to extract the power adjustment amount.

11. The method according to claim 10, wherein the at least one function comprises at least one continuous, smoothly varying function.

* * * * *